United States Patent

[11] 3,626,985

| [72] | Inventors | Lennart G. Erickson<br>2075 Pioneer Court, San Mateo, Calif. 94402;<br>Max C. Eastman, San Anselmo, Calif. |
|---|---|---|
| [21] | Appl. No. | 776,501 |
| [22] | Filed | Nov. 18, 1968 |
| [45] | Patented | Dec. 14, 1971 |
| [73] | Assignee | said Erikson, by said Eastman |

[54] SELF-EMPTYING HOSE
18 Claims, 5 Drawing Figs.

[52] U.S. Cl. .................................................. 138/115, 251/5
[51] Int. Cl. .................................................. F16l 9/18
[50] Field of Search .................................................. 138/28, 30, 114, 115, 119; 137/564.5; 251/5; 103/223

[56] References Cited
UNITED STATES PATENTS

| 2,734,462 | 2/1956 | Schaefer | 138/28 X |
| 2,735,642 | 2/1956 | Norman | 103/223 X |
| 2,982,511 | 5/1961 | Connor | 251/5 |
| 3,062,153 | 11/1962 | Losey | 251/5 UX |
| 3,426,803 | 2/1969 | Kikukawa | 138/114 |

Primary Examiner—Charles J. Myhre
Attorney—Townsend and Townsend

ABSTRACT: A self-emptying hose capable of discharging residual liquid in the hose after positive flow through the hose has been terminated. The discharge is accomplished by air contained in a pocket formed between an inner hose and an outer hose. When water is flowed through the inner hose under sufficient pressure, the air in the pocket is compressed and the inner hose is fully opened. When water flow is terminated and the pressure drops, the air in the pocket collapses the inner hose and squeezes out residual water.

PATENTED DEC 14 1971
3,626,985
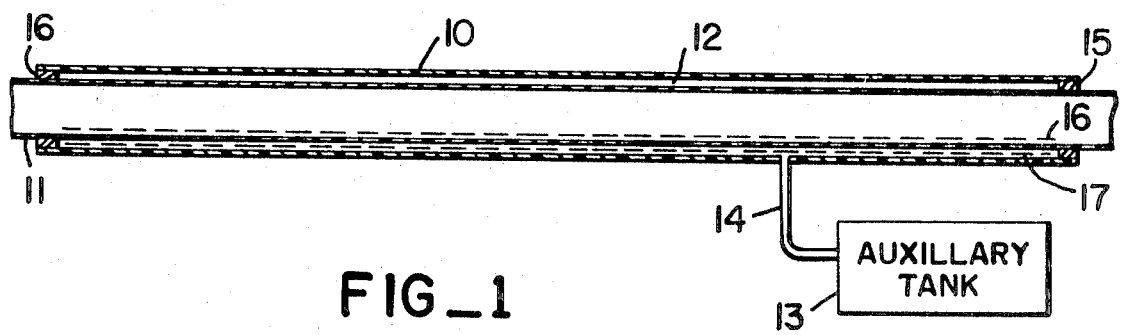
FIG_1
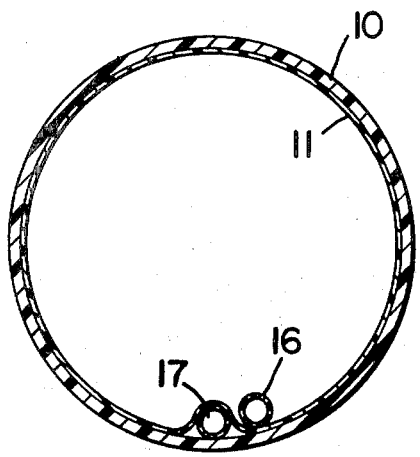
FIG_2
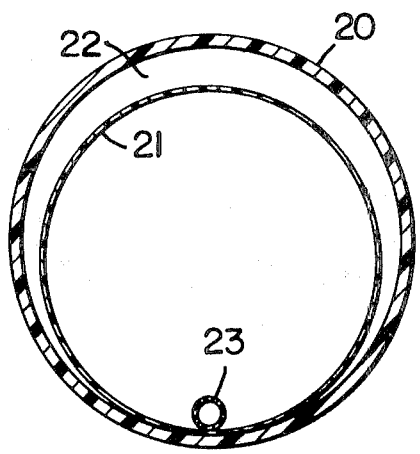
FIG_3
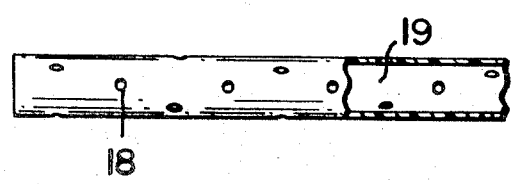
FIG_5
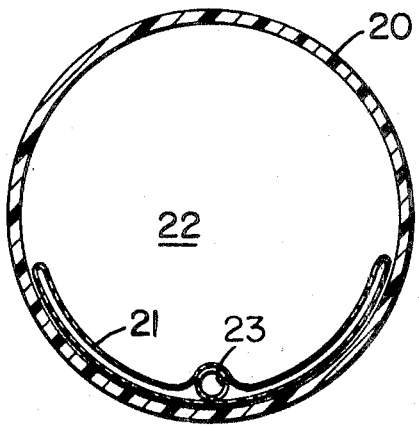
FIG_4
INVENTORS
LENNART G. ERICKSON
MAX C. EASTMAN
BY
Townsend and Townsend
ATTORNEYS

SELF-EMPTYING HOSE

This invention relates to conduits such as hoses. More particularly it relates to the emptying of the conduit at the end of a period of use.

In the preferred embodiment the present invention is applied to the discharge of residual water in a hose after positive water flow through the hose has been stopped. The advantages of the invention are especially apparent in a situation where the hose is used as the water supply line for a mobile sprinkler system of a type described in copending patent application Ser. No. 767,955, filed Oct. 16, 1968. In the mobile sprinkler system described water is sprinkled on an intermittent basis. The sprinkler system is moved during periods of nonflow of water. During movement of the system it is advantageous for the water supply line to be substantially empty in view of the weight contributed by the water in the hose. Thus a typical hose for supplying the sprinkler system may be 6 inches in diameter. It weighs less than 125 pounds per 100 ft. of hose in the empty condition, but over 1,300 per 100 ft. of hose when filled with water. Further, a typical sprinkler supply hose may be up to 150 ft. in length to accommodate lateral movement of the sprinkler system over the area being irrigated. The hose is difficult to drain effectively by gravity through the conventional types of automatic drain valves in view of the fact that the hose normally either lies or rolls horizontally on the ground and at times portions of the hose may lie in depressions in the ground surface. The present invention provides a way for substantially completely discharging water in such a sprinkler supply hose so that the hose can be moved easily in its lightest condition with a minimum of attendant frictional drag with respect to the ground.

The application of the invention to a mobile sprinkler system water supply hose is exemplary only and many other applications will be apparent. The invention can be applied to the emptying of any fluid holding or conduit type of vessel. An example of another situation in which the emptying of a hose is beneficial is in connection with hoses used for fueling ships. Hoses used for refueling large ships are commonly of substantial size and weight. At the end of a refueling sequence the hose is full of fuel and must be emptied. The present invention will eliminate much of the physical labor and equipment now used for such a purpose.

In accordance with the preferred embodiment a self-emptying hose is provided comprising an inner hose and an outer hose disposed to enclose the inner hose. A space is defined between the two hoses. The space is sealed, usually at the ends of the hoses, to close fluid communication between the space and the ambient atmosphere. The space is filled with a suitable gas such as air at a relatively low pressure but sufficient to cause collapse of the inner hose under ambient conditions. Flow of water or other liquid at a sufficiently high pressure greater than that of the space between the inner and outer hoses compresses the air in the space and prevents collapse of the inner hose so that the hose functions in the usual manner. When the flow and pressure inside of the inner hose is terminated, the air in the space between the hoses collapses the inner hose to squeeze the residual water out of the inner hose.

In the accompanying drawings:

FIG. 1 is a schematic side sectional view of one embodiment of the invention in which the inner and outer hoses are relatively snugly fitted and the relatively narrow space therebetween is supplemented by an auxiliary tank.

FIG. 2 is an enlarged end sectional view of the hose shown in FIG. 1 illustrating the use of perforated rigid tubes for assisting in drainage of fluid.

FIG. 3 is an end sectional view of an alternate embodiment in which the airspace between the inner and outer hoses is provided by using an inner hose of substantially smaller diameter than that of the outer hose.

FIG. 4 is an end sectional view of the embodiment shown in FIG. 3 illustrating the inner hose in collapsed position following emptying of the hose.

FIG. 5 is a side elevation partially broken away of a segment of the perforated tubes illustrated in FIGS. 1-4.

In more detail, FIG. 1 shows the combination of an outer hose 10 and an inner hose 11. Hose 10 substantially encloses hose 11. The outer diameter of hose 11 is relatively close in dimensions to the inner diameter of hose 10 so that only a relatively small space 12 is defined therebetween. To supplement the relatively small volume of space 12 an auxiliary tank 13 is connected to space 12 through conduit 14.

The volume defined by space 12 and tank 13 is sealed with respect to the ambient atmosphere by suitable collars 15 and 16 at the ends of the composite hose structure. Space 12 and tank 13 is filled with a suitable gas such as air. When fluid such as water is flowed internally of hose 11, hose 11 is maintained at its fully extended cross-sectional dimension as seen in FIGS. 1 and 2. By appropriate selection of the volume of air in space 12 and tank 13, and consequently the pressure thereof, the air will serve to collapse and deform hose 11 in a manner similar to that shown in FIG. 4 to cause a discharge and emptying of hose 11.

The arrangement shown in FIGS. 1 and 2 has the advantage of compactness by way of reduced overall size and weight as compared with the embodiment to be discussed in connection with FIGS. 3 and 4. In addition there is a mechanical advantage in the combined strength of the closely fitted inner and outer hoses.

During expansion and contraction and collapse of inner hose 11 it is possible that a volume of air in space 12 or water inside of hose 11 could become trapped for instance between two collapsed areas. To protect against such a possibility relatively rigid (they are not collapsed by the deformation of hose 11) perforated tubes 16 and 17 are inserted as shown in FIG. 2. The tubes 16 and 17 are of the construction illustrated in FIG. 5 and include a plurality of holes such as hole 18 communicating with an internal central canal 19.

Other alternatives to tubes 16 and 17 are contemplated. For example, the inside surfaces of hoses 10 and 11 might be serrated or provided with other protrusions defining intercommunicating passages along the length of the composite hose assembly between the serrations or protrusions. The passages would serve the same purpose as tubes 16 and 17.

Elimination of the perforated tube or its alternative can be used to effectively form a valve type of closure at either end of the hose when it is desired to close fluid communication. For instance, it may be desirable to seal inner hose 11 adjacent collar 15 upon cessation of use of the hose. To accomplish this, tube 16 can be shortened so as to be absent from the region adjacent the end of the hose near collar 15. When fluid flow through hose 11 is terminated and the inner hose 11 collapses, that terminal section of hose 11 into which tube 16 does not extend will become completely collapsed to the extent that a leakproof seal results.

This automatic valve action by the present hose composite would be particularly advantageous when inflammable liquids are being flowed through the hose. When the flow is terminated, the automatic closing of one end of the hose is designed to close and seal itself. If both ends of the hose are disconnected from the system in which it is being used, the residual fluid inside of hose 11 would be selectively discharged through the open end of the hose for recovery while the opposite end would quickly close tightly and prevent escape of liquid.

With respect to FIGS. 3 and 4 outer hose 20 has a substantially larger diameter than inner hose 21 to define a relatively larger space 22 therebetween. Space 22 extends along substantially the entire length of hoses 20 and 21 similar to space 12 in FIGS. 1 and 2. Space 22 is also filled with an appropriate amount of gas that is under compression when fluid is flowing internally of hose 21 at a sufficiently high pressure. When fluid flow through hose 21 is terminated, the compressed gas in space 22 collapses hose 21 as shown in FIG. 4 to cause it to be emptied. As before, a perforated tube 23 may be included to avoid incomplete emptying of areas that might become isolated during the collapse of inner hose 21. Again, perforated tube 23 can be selected so as to terminate short of one end of the composite hose to thereby create an automatic closure at that end.

The embodiment shown in FIGS. 3 and 4 also has mechanical strength advantages because of the double hose structure. In this case the air or gas that is compressed in space 22 works against the exterior of hose 21 to offset the equivalent amount of pressure being exerted by the liquid flowing internally of hose 21.

The larger volume of space 22 gives the embodiment of FIGS. 3 and 4 an additional advantage by way of buoyancy in liquid. If hoses 20 and 21 are selected to provide a sufficiently large volume for space 22, the resulting composite hose structure can be rendered buoyant in liquid even when filled with liquid during use. This feature has particular advantage is marine applications where there is need to support a hose on water during its use.

With respect to all embodiments of the invention the ability to select the volume and pressure in the space surrounding the interior hose provides a mechanism by which automatic throttling of the liquid flow through the inner hose can be achieved. It has already been discussed how an end of the hose can be sealed by a collapse of the inner hose adjacent the end when positive flow through the hose has been terminated. This same concept is applicable to control of flow through the hose generally.

The pressure of the gas in the space surrounding the inner hose will govern the conditions under which flow can be interrupted. As the liquid pressure flowing through the inner hose falls appreciably below the pressure of the gas, the inner hose will begin to be collapsed. Commencement of the collapsing motion will increase upstream pressure with a reduction in the flow rate downstream. In the event of a failure of the pump or other means creating the pressured liquid flow resulting in an inability to maintain pressure equal to or above that of the gas pressure, a collapse and closure of the inner hose would result. Flow through the hose is thereby substantially terminated. In the event of a leak in the downstream side of the system or other abnormal condition causing a reduction in upstream liquid pressure, a partial collapse would occur to restrict flow of fluid thereby maintaining more nearly normal pressure in the upstream side.

The rate of the collapse of the inner hose depends upon the size of the gas volume with respect to the volume of the inner hose. Where space 22 or auxiliary tank 13 for example have relatively large volumes compared with the volume of the inner hoses, the rate of collapse of the inner hose will be relatively rapid. Conversely, where the gas volumes are smaller, the rate of collapse will be relatively slower.

As an example of this throttling of liquid flow through the inner hose, space 22 may be filled with air at 80 p.s.i. and water flowed through inner hose 21 at 100 p.s.i. If the pump supplying the water to hose 21 malfunctions, hose 21 will be collapsed as soon as the water pressure falls to about 75 p.s.i. and flow through the hose will be essentially terminated.

This feature by which flow through the conduit is interrupted when the liquid pressure falls below a preselected amount may be advantageous in preventing damage to the pump which might otherwise become overloaded in attempting to maintain pressures and flows caused by a downstream leak. Alternatively, it may avoid problems downstream caused by water being supplied in insufficient quantities and pressures.

The vessel or conduit modified in accordance with this invention for self-emptying may utilize any suitable flexible fluid impervious liner material for functioning in the manner of inner hoses 11 and 21. In the preferred embodiment involving hoses, one suitable arrangement useful for sprinkler irrigation application might include a 6-inch diameter inner hose made of thin flexible nylon reinforced plastic construction designed for up to 100 p.s.i. forces. This type of a hose expands about 10 percent under pressure. The outer hose is suitably one of 7-inch diameter and of similar construction. The space therebetween can be sealed at the hose ends with an appropriate sleeve and cement such as an epoxy resin.

When a hose of the preceding type is connected to a mobile sprinkler system of the type described in the earlier referenced copending application and the water supply turned off, the draining sprinkler line (which is elevated at about 6 ft. off ground level) will create a static water pressure inside the ground level inner hose of about 2½ p.s.i. In such an application the air sealed in the space between the inner and outer hoses is supplied in sufficient volume to create a terminal pressure in the fully collapsed condition of about 4–5 p.s.i. in the space between the hoses. This differential will serve to deform and collapse the nylon inner hose and cause it to be substantially emptied. When water is flowed through the inner hose, for example, at about 90 p.s.i. suitable for use with the mobile sprinkler system, the inner hose will be fully expanded within the limits noted and the air in the space between the hoses will be compressed. In this example under discussion, the air pressure in the space between the hoses would be about 50 p.s.i. during water flow. Of course in no case would the pressure of the gas between the hoses exceed the water pressure flowing through the inner hose.

The particular size and geometry of the several parts, volume of the space between the vessel and inner flexible liners, and pressure relationships will be selected depending upon the particular embodiment of the invention. In all cases the self-emptying action is completely automatic.

While one embodiment of this invention has been shown and described, it will be apparent that other adaptations and modifications can be made without departing from the true spirit and scope of the invention.

What is claimed is:

1. A self-emptying hose comprising: an inner hose; an outer hose disposed to enclose said inner hose with a space defined therebetween; means for sealing said space to close fluid communication between said space and the ambient atmosphere; a preselected volume of gas trapped in said space under sufficient pressure to cause collapse of said inner hose when fluid which may be interiorly of said inner hose drops below the pressure of the gas trapped in said space, said inner hose and said outer hose having different diameters to cause said space to be of substantial volume; and means interiorly of said inner hose for conducting fluid therethrough from any location therein when said inner hose is in a collapsed condition to avoid incomplete emptying of areas that might become isolated during the collapse of said inner hose.

2. A self-emptying hose in accordance with claim 1, and including second means interiorly of said outer hose for conducting gas therethrough from any location therein for all positions of said inner hose.

3. A self-emptying hose in accordance with claim 1, wherein said conducting means includes a relatively rigid tube having perforations along its length communicating with an internal canal.

4. A self-emptying hose in accordance with claim 2, wherein said second means includes a relatively rigid tube having perforations along its length communicating with an internal canal.

5. In combination: a fluid conduit; a liner disposed interiorly thereof along its length for deformation under pressure to squeeze out fluid in said conduit, there being a pocket defined between said liner and conduit with the pocket being sealed with respect to the ambient atmosphere and containing gas at a preselected pressure greater than ambient conditions sufficient to cause said liner to deform, the flow of fluid through said conduit at a certain pressure being sufficient to prevent deformation of said liner; and means associated with said conduit along its length for maintaining fluid communication therethrough when said liner is deformed to avoid complete emptying.

6. A fluid conduit in accordance with claim 5, wherein said maintaining means is absent adjacent at least one end of said conduit to close fluid communication through said one and when said liner is deformed.

7. Self-emptying fluid flow apparatus comprising: an inner hose collapsible along substantially its entire length; an outer conduit surrounding the inner hose, the length of each of said inner hose and said outer conduit being many times greater than its transverse dimension; means coupled with the hose and the conduit for sealing the junctions between proximal ends thereof; and a source of fluid in fluid communication with the interior of said outer conduit and having a pressure sufficient to collapse the inner hose along substantially its entire length to force fluid therefrom when the fluid pressure in the inner hose is below said fluid pressure of said source to thereby empty the inner hose.

8. Apparatus as set forth in claim 7, wherein said inner hose has means therein for placing different interior locations thereof in fluid communication with each other when said inner hose is collapsed.

9. A method of handling a fluid comprising: providing a fluid conduit capable of collapsing along substantially its entire length with such length being many times greater than its transverse dimension; providing a source of fluid at a predetermined pressure for fluid communication with the region surrounding substantially the entire length of the conduit; directing a second fluid into and through the conduit with the second fluid being at a pressure greater than said predetermined pressure; and reducing the pressure of the second fluid in said conduit to thereby cause substantially the entire length of the conduit to collapse under the influence of the fluid pressure in said region to thereby empty said conduit.

10. A method as set forth in claim 9, wherein is included a step of providing a secondary path for the movement of the fluid in said region longitudinally of the conduit.

11. A method as set forth in claim 9, wherein is included the step of strengthening said conduit against outward expansion as said second fluid flows therethrough.

12. A method as set forth in claim 9, wherein said step of providing said source includes placing a second conduit in surrounding, spaced relationship to the first-mentioned conduit, sealing the ends of the second conduit to the proximal ends of the first conduit to close the space between the conduits, and placing a mass of the first-mentioned fluid in said space.

13. A method as set forth in claim 9, wherein said step of providing said source includes placing a second conduit in surrounding relationship to the first-mentioned conduit with the first conduit having an outer diameter substantially the same as the inner diameter of the second conduit, sealing the ends of the second conduit to the proximal ends of the first conduit, and providing a closed chamber for fluid communication with the interior of the second conduit, with the chamber being exteriorly of the second conduit and having a fluid therein at said predetermined pressure.

14. A method as set forth in claim 9, wherein said step of reducing the pressure of the second fluid includes stopping the flow of the second fluid in said conduit.

15. A method of handling a fluid comprising: providing a collapsible fluid conduit having a length many times greater than its transverse dimension; providing a closed region in surrounding relationship to the conduit along a substantial portion of its length with the region having a compressible fluid therein at a predetermined pressure; directing a second fluid into and through the conduit with the second fluid normally being at a pressure greater than said predetermined pressure; reducing the pressure of the second fluid in said conduit to thereby cause the conduit to collapse under the influence of the fluid pressure in said region; and conducting the second fluid from any location in said conduit along a portion of the length thereof when the conduit is collapsed to avoid fluid accumulation at isolated areas therein.

16. Self-emptying fluid flow apparatus comprising: a collapsible inner hose; an outer conduit surrounding the inner hose, the length of each of said inner hose and said outer conduit being many times greater than its length, said inner hose being collapsible along substantially its entire length when a fluid force is exerted thereon, the inner hose adapted to convey a first fluid under pressure therethrough; means coupled with the inner hose and the outer conduit for sealing the junctions between proximal ends thereof; and means coupled with the outer conduit for placing a source of a second fluid under pressure in fluid communication with the interior of said outer conduit, whereby said second fluid will provide a fluid force to cause the collapse of substantially the entire length of said inner hose when the fluid pressure in the inner hose is less than the pressure of said second fluid.

17. An apparatus as set forth in claim 16, wherein the outer diameter of the inner hose is substantially the same as the inner diameter of the outer hose, whereby the inner hose fits relatively snugly within said outer hose when fluid under pressure flows through said inner hose, said source including a closed tank exteriorly of said outer hose.

18. Apparatus as set forth in claim 16, wherein said outer conduit has an inner diameter greater than the outer diameter of the inner hose to define a space therebetween, said source including a mass of said second fluid in said space.

* * * * *